United States Patent
Yuan

(10) Patent No.: US 6,863,638 B1
(45) Date of Patent: Mar. 8, 2005

(54) DRIVE RING CVT COUPLER

(75) Inventor: Jing Yuan, Rochester Hills, MI (US)

(73) Assignee: The Gates Corporation, Denver, CO (US)

( * ) Notice: Subject to any disclaimer, the term of this patent is extended or adjusted under 35 U.S.C. 154(b) by 0 days.

(21) Appl. No.: 10/444,864

(22) Filed: May 22, 2003

Related U.S. Application Data

(62) Division of application No. 09/957,065, filed on Sep. 19, 2001, now abandoned.

(60) Provisional application No. 60/234,848, filed on Sep. 22, 2000.

(51) Int. Cl.$^7$ ............................................. F16H 15/14
(52) U.S. Cl. ......................................... 476/50; 476/49
(58) Field of Search ............................. 476/50, 51, 52, 476/53, 47, 49

(56) References Cited

U.S. PATENT DOCUMENTS

| | | | | |
|---|---|---|---|---|
| 2,089,003 A | * | 8/1937 | Sack | 476/53 |
| 2,199,491 A | | 5/1940 | Heynau | 74/193 |
| 2,480,968 A | | 9/1949 | Ronai | 74/193 |
| 2,931,235 A | * | 4/1960 | Hayward | 476/1 |
| 2,952,167 A | * | 9/1960 | Nelson | 476/53 |
| 3,257,857 A | * | 6/1966 | Davin et al. | 476/53 |
| 4,646,581 A | * | 3/1987 | Bondurant | 476/38 |
| 4,875,894 A | | 10/1989 | Clark | 474/49 |
| 5,575,734 A | * | 11/1996 | Rondinelli | 476/55 |
| 5,709,624 A | | 1/1998 | Donowski | 474/8 |

FOREIGN PATENT DOCUMENTS

FR            258792           9/1926

(Continued)

*Primary Examiner*—William C. Joyce
(74) *Attorney, Agent, or Firm*—J. A. Thurnau, Esq.; C. H. Castleman, Esq.; S. G. Austin, Esq.

(57) ABSTRACT

A single drive ring CVT coupler. Opposing inclined planar sides on outer circumferences of the drive ring have a high friction coefficient for enhanced engagement and power transmission between the pulleys and the drive ring. The drive ring rotationally operates between the cooperating pulleys of a moveable sheave CVT transmission. The opposing sides are inclined at an angle to each other for proper fit between the sheaves of the driver pulley and driven pulley. The drive ring operates between the outboard portions of each pulley. In an alternate embodiment, a drive ring operates in a bearing and is retained between the driver and driven pulleys by a retainer that spans between the pulley shafts. The drive ring comprises inclined opposing frictional sides on outer circumferences for frictionally engaging the sheave sides of a driver pulley and driven pulley. The drive ring operates between the inboard portions of the driver and driven pulleys.

4 Claims, 2 Drawing Sheets

FOREIGN PATENT DOCUMENTS

| | | | | | | |
|---|---|---|---|---|---|---|
| FR | 773951 | 11/1934 | JP | 2-304239 | * | 12/1990 |
| GB | 599566 | 3/1948 | DE | 749611 | | 11/1994 |
| FR | 2269000 | 11/1975 | | | | |

* cited by examiner

DRIVE RING CVT COUPLER

REFERENCE TO RELATED APPLICATIONS

This application is a divisional of U.S. application Ser. No. 09/957,065 filed Sep. 19, 2001, now abandoned, which claims priority from U.S. provisional application 60/234,848 filed Sep. 22, 2000.

FIELD OF THE INVENTION

The invention relates to CVT couplers and more particularly to drive ring CVT couplers for transmitting rotary motion and power from one CVT pulley to another.

BACKGROUND OF THE INVENTION

It is well known in the art that a gear type transmission may be used for operating a motor vehicle, motorcycle or the like. The transmission connects the motor (driver) to the drive wheels (driven). Transmissions generally comprise a finite number of gears, usually three or four. Only one of the gears is most efficient, so operating the motor in one of the other gears necessarily reduces efficiency. For the purposes of improving fuel efficiency, a continuously variable transmission, or CVT, is preferable.

A CVT is infinitely variable so a wide range of gear ratios is made available as compared to a gear type transmission. The CVT transmission generally comprises a driver and driven pulley. The pulleys are connected by a belt trained around each. Various types of belts have been developed for use in continuously variable transmissions.

Generally, the CVT Belts have a silhouette similar to that of a conventional V-belt. In particular, they are broad at the top and narrow at the bottom and designed to fit between the sheaves of the pulley that define an angular groove. The pulleys on which the belt is trained each comprise a moveable sheave and a fixed sheave. Each sheave having a truncated cone shape. Generally, one of the sheaves moves axially while the other remains fixed.

Moving one sheave in relation to the other effectively varies the effective diameter, $\phi$, of the pulley within which the belt operates. Consequently, belt linear speed is a function of the effective diameter of the pulley that is, in turn, a function of the axial position of the sheaves relative to each other. Changing the effective diameter of the pulley changes the 'gear ratio'. Since the full range of the sheave is available for setting an effective diameter, a gear ratio is fully adjustable between the effective diameters of the driver and driven pulleys.

Although the prior art CVT belts are longitudinally flexible, each also has characteristics not found in other power transmission belts. For example, the belts are required to have transverse rigidity. This allows the belt to run at a particular effective diameter without being crushed between the pulley sheaves.

Unlike the more flexible belts, a rigid drive ring may also be used as a power transmission means. The drive ring operates between the two pulleys, or a belt may be trained over a drive ring on a single pulley.

Regarding the prior art relationship between the pulley and the belt, U.S. Pat. No. 5,709,624 to Donowski discloses a variable diameter pulley. A single drive ring runs in the sheaves of a single pulley. A flexible belt runs on the drive ring through the pulley. As the sheaves move with respect to each other, the effective diameter of the pulley is changed. The Donowski device comprises a single drive ring used as a part of an auxiliary drive system of an internal combustion engine. A stabilizing member is also required to maintain the axis of rotation of the drive ring parallel to the axis of rotation of the sheave members. The Donowski device does not lend itself to use in a CVT transmission.

Also representative of the prior art is U.S. Pat. No. 4,875,894 to Clark, which discloses a continuously variable transmission. The transmission comprises an input and output shaft, each having a rotary disk assembly. The rotary disk assemblies each have contact pads that describe circles, and having continuously variable diameters. The two rotary disk assemblies are connected by a coupling mechanism, such as a single rigid coupling ring. Power transmission occurs between each pulley through rotation of the ring.

Each of the prior art systems requires complex rotary assemblies or guide apparatus to control operation of the transmission and the location of the drive ring. Further, the drive ring operates with torque actuated pads that are a component of a multi-part rotating assembly, adding further complexity.

What is needed is a drive ring CVT coupler comprising a single drive ring usable in moveable sheave CVT pulleys. What is needed is a drive ring CVT coupler that has high friction opposing inclined surfaces on the drive ring. The present invention meets these needs.

SUMMARY OF THE INVENTION

The primary aspect of the invention is to provide a drive ring CVT coupler comprising a single drive ring useable in moveable sheave CVT pulleys.

Another aspect of the invention is to provide a drive ring CVT coupler that has high friction opposing inclined surfaces on the drive ring.

Other aspects of the invention will be pointed out or made obvious by the following description of the invention and the accompanying drawings.

The invention comprises a single drive ring CVT coupler. Opposing inclined planar sides on outer circumferences of the drive ring have a high friction coefficient for enhanced engagement and power transmission between the pulleys and the drive ring. The drive ring rotationally operates between the cooperating pulleys of a moveable sheave CVT transmission. The opposing sides are inclined at an angle to each other for proper fit between the sheaves of the driver pulley and driven pulley. The drive ring operates between the outboard portions of each pulley.

In an alternate embodiment, a drive ring operates in a bearing and is retained between the driver and driven pulleys by a retainer that spans between the pulley shafts. The drive ring comprises inclined opposing frictional sides on outer circumferences for frictionally engaging the sheave sides of a driver pulley and driven pulley. The drive ring operates between the inboard portions of the driver and driven pulleys.

BRIEF DESCRIPTION OF THE DRAWINGS

The accompanying drawings, which are incorporated in and form a part of the specification, illustrate preferred embodiments of the present invention, and together with a description, serve to explain the principles of the invention.

DETAILED DESCRIPTION OF THE PREFERRED EMBODIMENT

Figure 1:
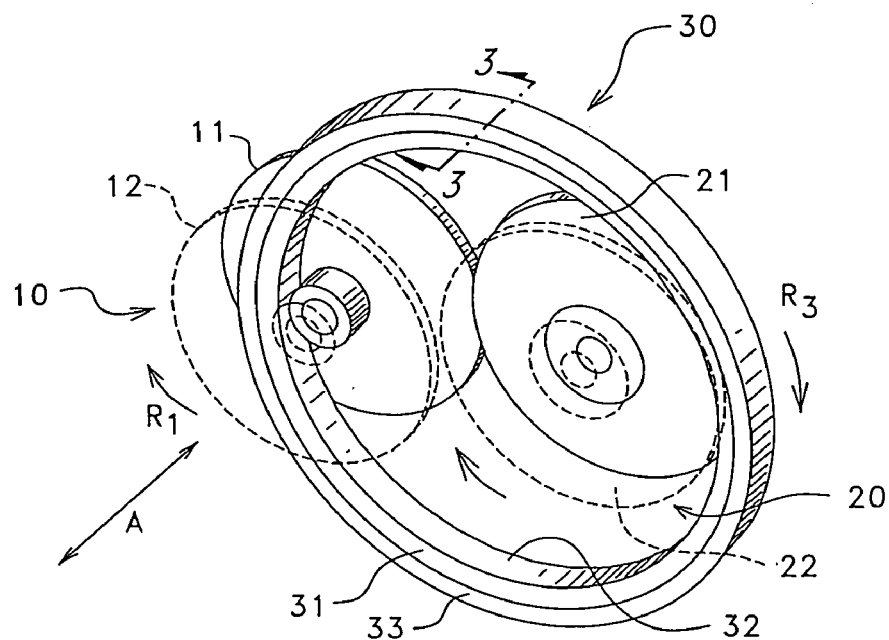
FIG. 1 is a perspective view of the invention.

FIG. 1 is a perspective view of the invention. Drive ring 30 rotationally operates between drive pulley 10 and driven pulley 20. Driver 10 comprises sheave sides 11, 12. Driven 20 comprises sheave sides 21, 22. Driver 10 rotates in direction $R_1$ in response to an input torque from a power source.

Drive ring 30 comprises a monolithic body 33 and inclined sides 31, 32. Sides 31, 32 are substantially circular in form about an outer circumference of the body. Sides 31, 32 comprise a frictional material. In operation, sides 31, 32 bear on sheave sides 11, 12 and 21, 22. As the driver rotates, frictional interaction between the sheave sides 11, 12 and the drive ring sides 31, 32 cause the drive ring 30 to rotate in direction $R_3$. In the preferred embodiment the body 33 comprises a metallic material.

Sides 31, 32 frictionally interact with driven sheave sides 21, 22. Rotation of drive ring 30 in direction $R_3$ causes driven pulley 20 to rotate in direction $R_2$. As shown in FIG. 1, the drive ring operates between the outboard portions of the driver and driven pulleys. As can be appreciated, the inventive coupler provides a simple and efficient method of mechanically connecting the driver pulley to a driven pulley.

Sheave sides 11, 12 and sheave sides 21, 22 each move axially A relative to each other. As one skilled in the art can appreciate, axial movement of the pulley sheaves will change the spacing of the sheaves and thereby affect where the drive ring contacts the pulley. This determines the effective radius of the drive ring/pulley combination. By changing the spacing or axial relationship between the pulley sheaves for the driver pulley and driven pulley in a cooperative manner, one may infinitely vary the gear ratio of the CVT transmission. Axial movement of the drive pulley sheaves and the driven pulley sheaves causes an axis of rotation of the drive ring to translate relative to the axis of rotation of the drive pulley and the driven pulley, thereby changing a gear ratio.

Figure 2:
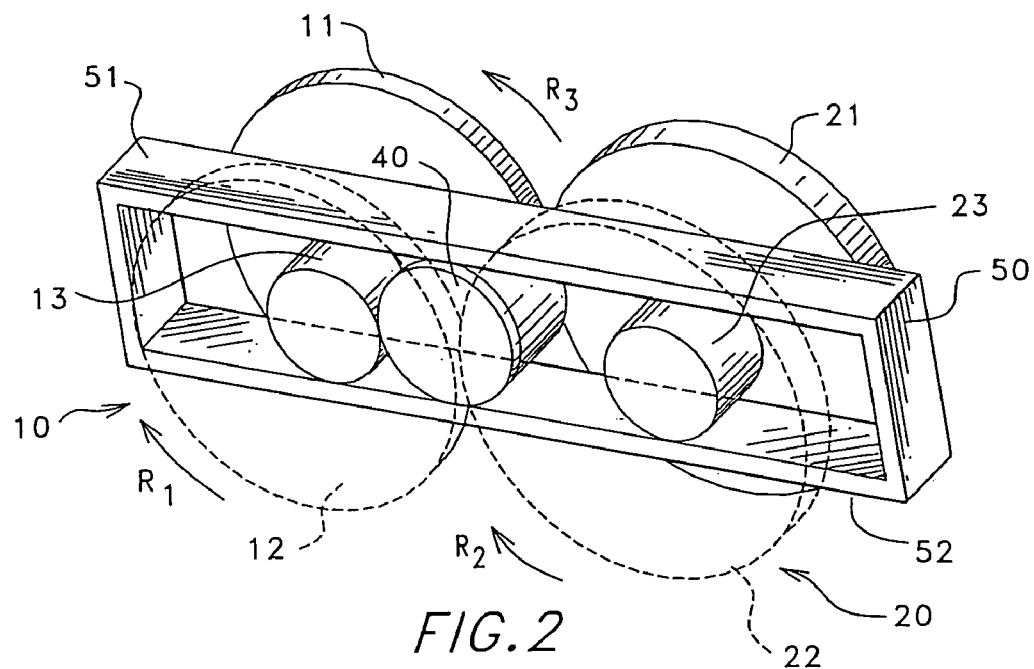
FIG. 2 is a perspective view of an alternate embodiment of the invention.

FIG. 2 is a perspective view of an alternate embodiment of the invention. Drive coupler 40 is rotationally contained between spaced sides 51, 52 of retaining member or retainer 50. Retainer 50 constrains drive coupler 40 to operate between driver pulley 10 and driven pulley 20. Retainer 50 is held in a position between the pulleys by cooperatively engaging, encircling or straddling the driver pulley shaft 13 and the driven pulley shaft 23. A surface of retainer 50 that contacts each pulley surface and pulley shaft comprises any low friction, high heat tolerant material known in the art.

In operation, driver 10 rotates in direction $R_1$. Drive coupler 40 rotates in direction $R_3$ which in turn causes driven pulley to rotate in direction $R_2$. The outer race of bearing 44, see FIG. 4, slidingly engages sides 51, 52 of retainer 50 thereby constraining drive ring 40 to operate between the driver and driven pulleys. As one can see from FIG. 2, the alternate embodiment operates between the inboard portions of the driver and driven pulleys.

Figure 3:
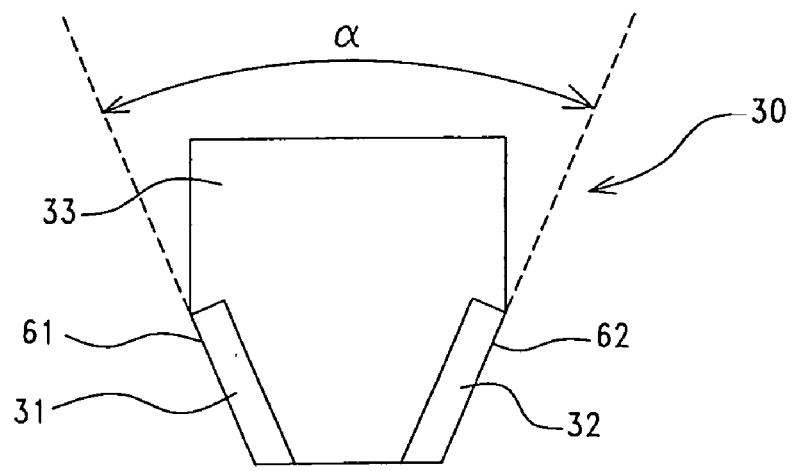
FIG. 3 is a cross-sectional view of the drive ring along line 3—3 in FIG. 1.

FIG. 3 is a cross-sectional view of the drive ring along line 3—3 in FIG. 1. Drive ring 30 comprises inclined opposing frictional sides 31, 32. Sides 31, 32 may comprise the same material as the body 33, or may be inserts comprising different material than the body 33, for example metallic, non-metallic, plastics or composites. The inserts are attached by adhesives or mechanical fasteners known in the art. In the preferred embodiment sides 61, 62 are planar. In an alternate embodiment, the sides 61, 62, that contact the sheaves, may have a slightly convex arcuate shape to accommodate a high compressive force between the sheaves, as in a high torque, maximum underdrive situation. Body 33 may comprise any metallic, non-metallic, plastic or composite material having a toughness and strength sufficient to maintain a shape and rigidity for proper power transmission as the drive ring rotates between the pulleys.

Figure 4:
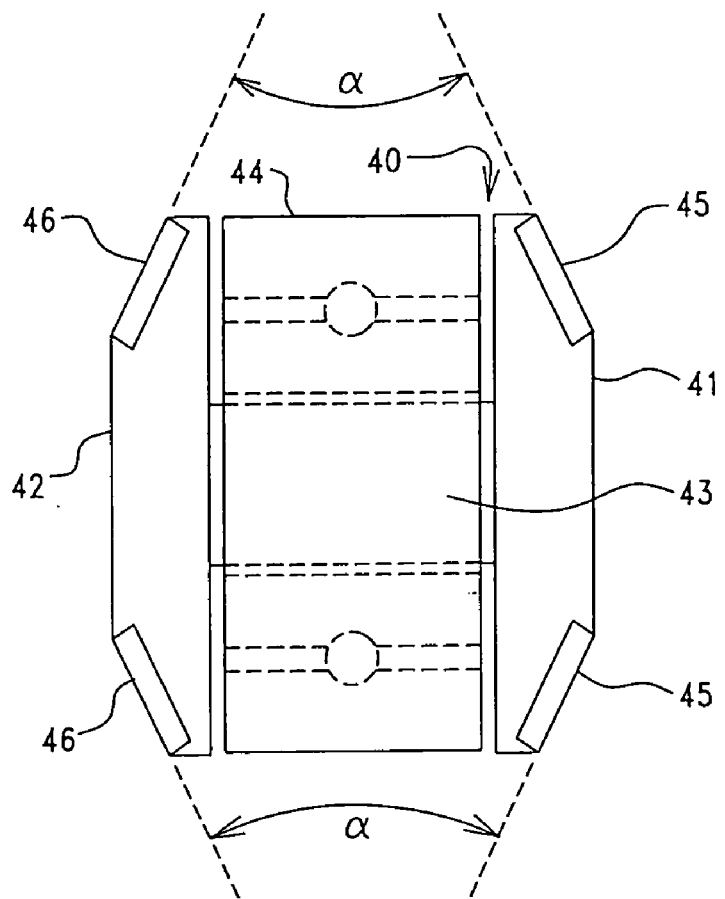
FIG. 4 is a front cross-sectional view of the alternate embodiment.

FIG. 4 is a front cross-sectional view of an alternate embodiment. Drive coupler 40 comprises side 41 and side 42. Side 41 comprises frictional material 45 on an inclined surface of side 41. Side 42 comprises frictional material 46 on an inclined surface of side 42. Axle 43 connects sides 41 and 42. Axle 43 rotates in bearing 44. A surface of the outer race of bearing 44 is slidingly engaged between sides 51, 52 of retainer 50, thereby allowing the drive ring to move laterally in response to an axial movement of the sheaves of the driver pulley and the driven pulley.

Included angle $\alpha$ is the angle between the frictional sides 31, 32 (see FIG. 3) and inclined sides of 41, 42, namely 45, 46. Angle $\alpha$ is substantially equal to an included angle between the sheave sides 11, 12 on the driver pulley 10 and to an included angle between sides 21, 22 on the driven pulley 20. The angle assures full contact between the sides of the drive ring and the driver pulley and the drive ring and the driven pulley for maximum power transmission.

Although a single form of the invention has been described herein, it will be obvious to those skilled in the art that variations may be made in the construction and relation of parts without departing from the spirit and scope of the invention described herein.

I claim:

1. A CVT coupler comprising:
    a body having opposing inclined surfaces and each opposing inclined surface having a substantially circular form;
    the opposing inclined surfaces describing an included angle;
    the body rotationally engaging a bearing, the bearing having an outer race;
    a retainer having substantially parallel opposing sides;
    the bearing outer race slidingly engaging the retainer whereby the bearing is moveable between the spaced opposing sides.

2. The CVT coupler as in claim 1, wherein the opposing inclined surfaces each further comprise a substantially planar surface.

3. A CVT transmission comprising:
    a first pulley having a first pulley shaft and opposing sheave sides that are axially moveable with respect to each other;
    a second pulley having a second pulley shaft and opposing sheave sides that are axially moveable with respect to each other;
    a body having opposing inclined surfaces on an outer surface, the opposing inclined surfaces having a substantially circular form about a circumference of the body;
    the body rotationally engaging a bearing;
    a retaining member having parallel sides cooperatively engaging the first pulley shaft and the second pulley shaft, whereby a position of the retaining member is maintained between the first pulley shaft and the second pulley shaft;

the bearing slidingly engaging the retaining member whereby the bearing is moveable between the opposing aides; and the opposing inclined surfaces engaged with the opposing sheave sides of the first pulley and moveably engaged with the opposing sheave sides of the second pulley, whereby a rotation is transmitted from the first pulley to the second pulley.

4. The CVT coupler as in claim 3, wherein the opposing inclined surfaces each further comprise a planar surface.

* * * * *